Patented July 14, 1925.

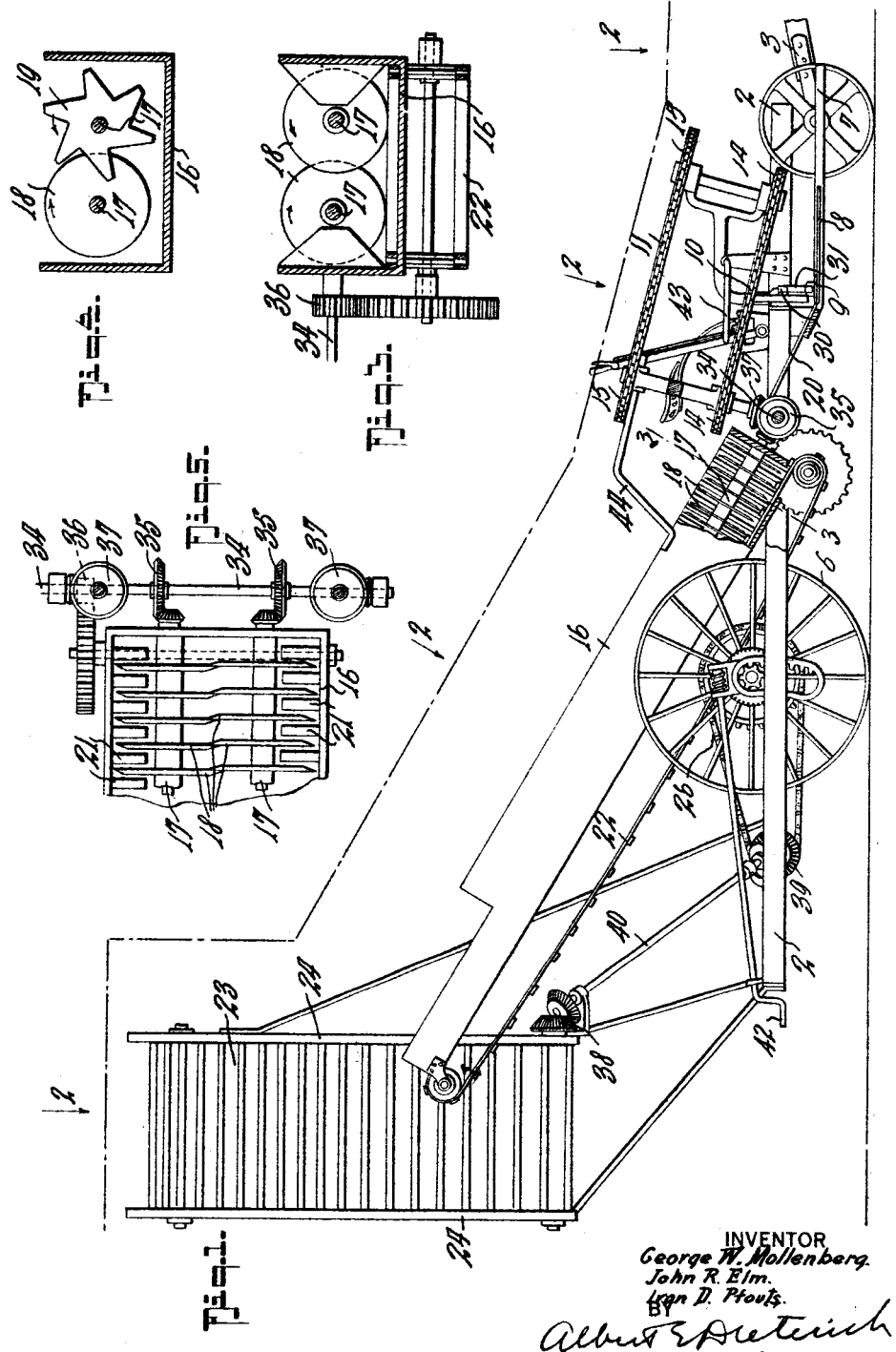

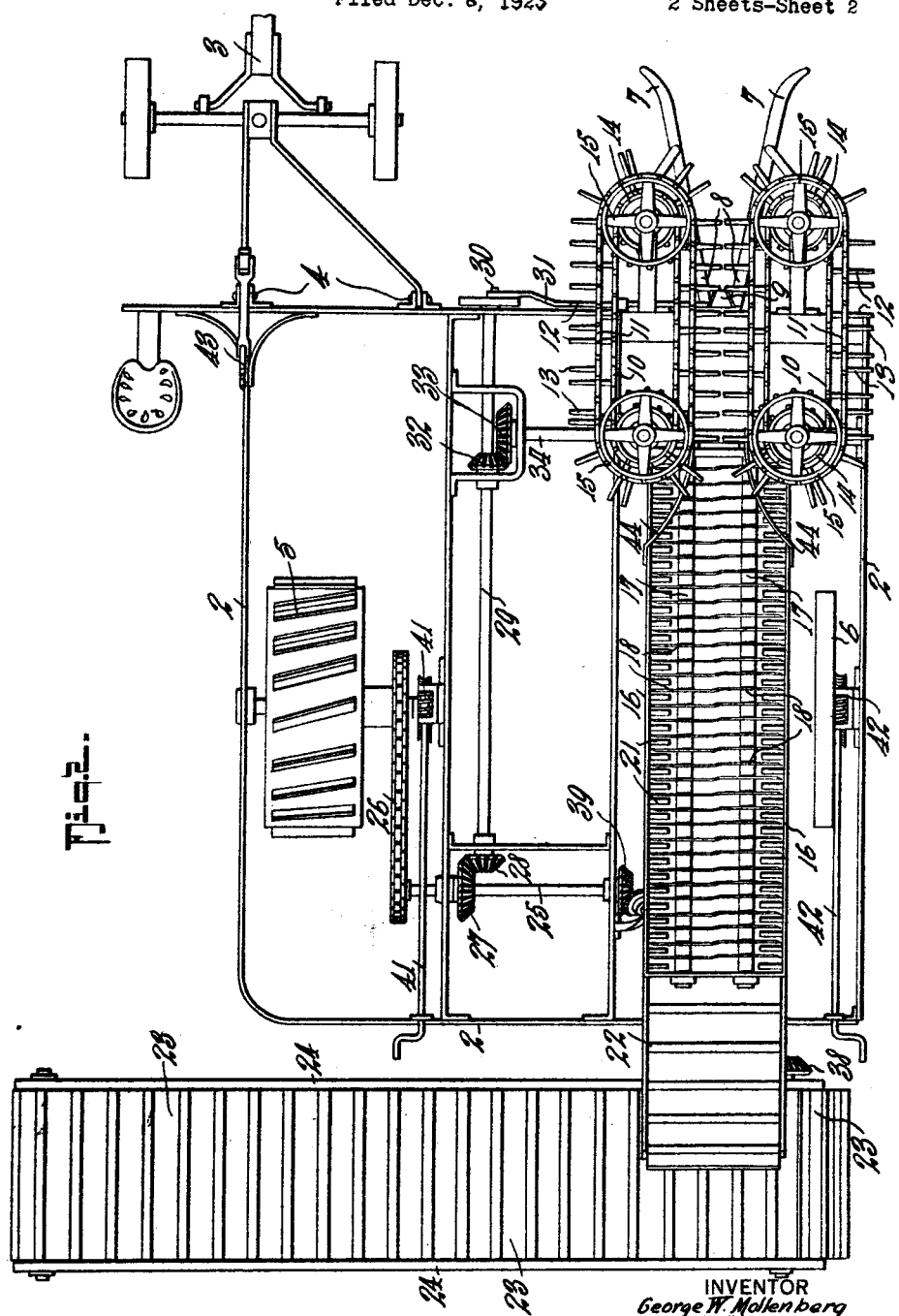

1,546,018

UNITED STATES PATENT OFFICE.

GEORGE W. MOLLENBERG, JOHN R. ELM, AND IVAN D. PFOUTS, OF HARDISTY, ALBERTA, CANADA.

ENSILAGE REAPER AND CUTTER.

Application filed December 8, 1923. Serial No. 679,493.

*To all whom it may concern:*

Be it known that we, GEORGE W. MOLLENBERG, JOHN R. ELM, and IVAN D. PFOUTS, citizens of the United States, residing at Hardisty, in the Province of Alberta, Canada, have invented certain new and useful Improvements in Ensilage Reapers and Cutters, of which the following is a specification.

This invention relates to a machine for reaping ensilage and for cutting it up and for delivering it into a wagon for conveyance to the silo, the object being to effect the reaping and cutting at one time by the same machine.

The invention is particularly described in the following specification, reference being made to the drawings by which it is accompanied, in which:

Fig. 1 is an elevation of the machine with a portion removed to show the cutting mechanism.

Fig. 2, a plan in the direction of the arrows 2 in Fig. 1.

Fig. 3 is a cross section on the line 3—3 of Fig. 1 of the cutter box to an enlarged scale.

Fig. 4 is a similar view showing a modification of the cutting knives, and

Fig. 5 is a detail of the driving mechanism at the end of the cutter box.

In these drawings 2 represents the frame of the machine which is substantially rectangular in plan and has longitudinal or transverse members within it, where supports for the mechanism are required, see Fig. 1. The pole or draught connection 3, which is offset to one side of the frame 2, is pin-connected to it at 4 and is provided with separate supporting wheels. The relatively broad driving wheel 5 is approximately in line with the draught connection and the grain wheel 6 is on the opposite side and in approximate axial alignment with 5.

Guide members 7 are secured to and project from the front end of the frame 2 on the side opposite the draught, which members are outwardly flared to collect and direct the crop to be cut between two fixed side cutting knives 8 at the required height from the ground. The edges of these fixed cutting knives converge to a single element knife blade 9, horizontally slidable between a leger plate and guards by which the final cutting of the stalks is effected.

Immediately above these knives 8 and 9 are two sets 10 and 11 of endless chains movable around sprockets 14 and 15. These chains are angled downward toward the front end, which projects slightly beyond the entrance to between the fixed side knives 8, and have fingers 12 and 13 outwardly projecting from them, the outer ends of which fingers may meet or even overlap one another while moving along the inner or adjacent stretches of the chains. These fingered chains 10 and 11 are designed to feed the crop to the knives and to support the stalks during the operation of cutting.

The upper chains 11 travel at a slightly faster speed than the lower ones 10, so that the upper ends of the crop, as cut from the ground, are drawn backward to cause the cut material to fall into a cutter box 16 in the bottom of which are two parallel shafts 17 on each of which is secured at short intervals apart a series of circular cutting knives 18, the adjacent edges of which knives overlap one another, as shown in Fig. 3. Or one set of these knives may be star-shaped, as at 19 in Fig. 4.

Beneath each fingered chain 10 and 11, where they deliver to the cutter box, a plain fence 44 is carried from the line of each chain to the side of the cutter box to prevent the cut material being carried around by the fingers 12 and 13 beyond the width of the box 16, and a bottom board 20 extends from the knife 9 to approximately the plane of the upper sides of the circular knives 18 to prevent the crop as cut from the ground falling thereto, and to ensure its delivery into the cutter box.

Between each pair of disc knives 18 fences 21 project from the sides of the cutter box 16 to deliver the material on the knives and to prevent the cut material being carried round by them.

In the bottom of the cutter box 16, which is substantially parallel to the knife shafts 17, that is, it is inclined downward toward the forward end, is an endless conveyor 22 by which the chopped material as it falls from the knives 18, is carried up the inclined cutter box and delivered to the lower end of an upwardly inclined transverse conveyor 23 in a chute 24 by which it is delivered into an attendant wagon for transportation to the silo.

The several mechanisms of this device are operated from the driving wheel 5 in its contact with the ground. A transverse shaft 25 across the rear end of the frame is driven by a sprocket chain 26 over a sprocket rotatable with the driving wheel 5 and one secured on the transverse shaft 25.

From this transverse shaft 25 a bevelled wheel and pinion 27, 28 drives a longitudinal shaft 29 at an increased speed of rotation and on the end of this shaft 29 is secured a crank 30, from the pin of which a rod 31 is connected to the reciprocating knife blade 9.

Secured on this same shaft 29 is a bevel pinion 32, the teeth of which mesh with those of a bevel wheel 33 secured on the end of a short transverse shaft 34, which extends across the front end of the cutter box 16, see Fig. 5. Bevel gears 35 drive the parallel shafts 17 of the cutter box from the shaft 34, in opposite directions, and a pinion 36 on the same shaft 34, see Fig. 3, drives the sprocket wheels of the conveyor 22.

The sprocket wheels 14 and 15 of the fingered chains 10 and 11 are driven by bevel gears 37 from the same shaft 34.

The elevating conveyor 23 is driven from the transverse shaft 25 by bevel gears 38, 39 and an angled shaft 40.

Means is provided at 41 and 42 for raising and lowering the frame 2 in relation to the axis of the wheels 5 and 6, and at 43 for raising and lowering the front end of the frame 2 at its connection to the pole carriage wheels 4, so as to vary the height of the knife 9 from the ground.

In use, as the machine is drawn along the row of corn, or other crop which it is desired to cut, the stalks are, by the guide members 7, gathered toward the knives and are either cut by the side knives 8 or by the reciprocating knife 9. As cut, the material is supported by the two sets of fingered chains which, travelling at different speeds, tilt the cut material backward and deliver it on the knives 18 of the cutter box where it is cut into short lengths, the disc knives being spaced apart to cut the required length. The crop falls through the knives as cut and is carried from the cutter box by the conveyor 22, and is delivered to the transverse conveyor 23 by which it is elevated and delivered into the wagon for conveyance to the silo.

The machine being drawn along the rows in which the crop is sown, may be thus quickly harvested and as harvested is cut up into short lengths as ensilage and continuously delivered, as cut, to an attendant wagon for delivery to the silo.

Having now particularly described our invention, we hereby declare that what we claim as new and desire to be protected in by Letters Patent, is:

1. An ensilage harvester, comprising the combination with a frame, of wheels supporting the same, a horizontal disposed knife for cutting the crop from the ground, means for delivering the cut crop backward, a cutter box, parallel rotatable shafts one located on each side of the middle line of the cutter box, a series of knives spaced apart on said parallel rotatable shafts, the edges of the blades of the separate shafts over-lapping one another, means for delivering the cut material from the cutter box, an elevating conveyor, and means for operating the several mechanisms.

2. An ensilage harvester having wheels, comprising the combination with a frame having a draught connection at one end adjacent one side, of a reciprocating knife adjacent the other side of the same end, means for collecting the crop from each side and delivering it to the knife, means for supporting the crop in the upright position while and after cutting and for delivering it backward, an elongated cutter box projecting rearwardly from the crop delivery means, parallel shafts one on each side of the middle line and in the upper part of the cutter box, closely spaced rotatable knives mounted on said shafts, the upper sides of which knives rotate toward one another, means for delivering the cut material from the cutter box and for elevating it for delivery, and means for operating the several mechanisms from the wheels of the harvester.

3. An ensilage harvester having wheels, comprising the combination with a frame having a draught connection at one end and adjacent one side, of wheels adjustably supporting the frame and its draught connection, a reciprocating knife adjacent the other side of the same end, fixed side knives angularly directed forward and outward from the reciprocating knife, guide members angularly directed forward from the side knives, endless chains mounted on sprockets at vertical distances apart on each side of the cutting knives, a cutter box rearwardly projecting from the reciprocating knife, parallel shafts one on each side of the middle line of the cutter box, knives mounted at short distances apart on said parallel shafts, the upper sides of said knives being rotatable toward one another, a transverse elevating conveyor means for conveying the cut material from the cutter box and for delivering it to the lower end of the transverse elevating conveyor, and means for operating the several mechanisms from one of the wheels of the harvester.

4. An ensilage harvester, comprising the combination with a frame having a draught connection at one end and adjacent one side, of wheels supporting the frame and the draught connection, means for adjusting the height of the frame from the ground, a reciprocating knife at the same end of the machine as the draught connection and adjacent the other side, fixed knives in an approximately horizontal plane, the edges of which knives are angled outward from one another and project forward from the reciprocating knife, endless feed chains mounted on sprocket wheels at vertical distances apart on each side of the cutting knife, said chains having fingers projecting outward from the chains, collecting members projecting angularly forward from the fixed knives to deliver the material within the scope of the feed chains, a cutter box projecting rearwardly from the feed chains, parallel shafts located one on each side of the middle line of the cutter box, knives mounted on said parallel shafts, said knives being closely pitched together on the shafts and those on one shaft overlapping with those on the other shaft, the upper sides of said knives being rotatable toward one another, a conveyor withdrawing the material from the cutter box, a transverse elevating conveyor receiving the material from the cutter box conveyor, and means for operating the several mechanisms from one of the wheels supporting the frame.

5. An ensilage harvester, comprising in combination, a frame having a draught connection at one end and adjacent one side, wheels adjustably supporting the frame and the draught connection at the required distance from the ground, a horizontally disposed reciprocating knife adjacent the other side of the same end, a receiving plate sloping angularly upward from the knife, endless chains mounted on sprocket wheels parallel to the plate and to one another and disposed one above the other on each side of the receiving plate, said chains having fingers outwardly projecting from them, the adjacent sides of said chains moving rearwardly from the knife and the upper chains travelling at a higher speed than the lower ones, a fence below the rear end of each chain to free the cut material from the fingers, a cutter box projecting rearwardly from the supporting plate into the open upper side of which box the plate delivers, parallel shafts rotatably mounted lengthwise of the cutter box one on each side of its middle line, the upper sides of which shafts are rotatable toward one another, disc knives secured on said shafts at short distances apart on said shafts, the edges of which knives overlap, guards inwardly projecting from the sides of the cutter box between each pair of knives, the upper edges of which guards are angled downward toward the middle of the box, a conveyor movable rearwardly along the bottom of the cutter box, a conveyor angled transversely upward from the rear end of the cutter box conveyor, and means for operating the several mechanisms.

In testimony whereof we affix our signatures.

GEORGE W. MOLLENBERG.
JOHN R. ELM.
IVAN D. PFOUTS.